US011518542B2

(12) United States Patent
Ducharme et al.

(10) Patent No.: US 11,518,542 B2
(45) Date of Patent: Dec. 6, 2022

(54) LANDING STRUCTURE FOR AN UNMANNED AERIAL VEHICLE

(71) Applicant: Hoverfly Technologies, Inc., Orlando, FL (US)

(72) Inventors: Alfred D. Ducharme, Oviedo, FL (US); Adam Stepien, Umatilla, FL (US); Jason Tabor, Orlando, FL (US); Lucas Colt Whitaker, San Leandro, CA (US); Daniel J. Burroughs, Longwood, FL (US)

(73) Assignee: HOVERFLY TECHNOLOGIES, INC., Orlando, FL (US)

( * ) Notice: Subject to any disclaimer, the term of this patent is extended or adjusted under 35 U.S.C. 154(b) by 332 days.

(21) Appl. No.: 16/714,257

(22) Filed: Dec. 13, 2019

(65) Prior Publication Data
US 2020/0262583 A1 Aug. 20, 2020

Related U.S. Application Data

(60) Provisional application No. 62/806,533, filed on Feb. 15, 2019.

(51) Int. Cl.
*B64F 1/00* (2006.01)
*B64C 39/02* (2006.01)

(52) U.S. Cl.
CPC ............. *B64F 1/007* (2013.01); *B64C 39/02* (2013.01); *B64C 39/024* (2013.01); *B64F 1/00* (2013.01); *B64C 2201/027* (2013.01); *B64C 2201/20* (2013.01)

(58) Field of Classification Search
CPC .... B64F 1/007; B64C 39/024; B64C 2201/20
See application file for complete search history.

(56) References Cited

U.S. PATENT DOCUMENTS

| | | | | |
|---|---|---|---|---|
| 2016/0001883 | A1* | 1/2016 | Sanz | B64C 39/024 244/17.23 |
| 2016/0039541 | A1 | 2/2016 | Beardsley et al. | |
| 2016/0257424 | A1* | 9/2016 | Stabler | B64F 1/20 |
| 2017/0050749 | A1* | 2/2017 | Pilskalns | B64F 1/362 |

FOREIGN PATENT DOCUMENTS

| | | |
|---|---|---|
| CN | 108945509 A | 12/2018 |
| WO | WO2018100564 A1 | 6/2018 |

OTHER PUBLICATIONS

International Search Report and Written Opinion dated Oct. 28, 2020 for PCT/US2020/018280.

* cited by examiner

*Primary Examiner* — Richard R. Green
*Assistant Examiner* — Steven J Shur
(74) *Attorney, Agent, or Firm* — Howard M. Gitten, Esq.; Lewis Brisbois Bisgaard & Smith LLP

(57) ABSTRACT

A system for landing an unmanned aerial vehicle has an unmanned aerial vehicle and a ground-based platform. A guide structure for receiving the unmanned aerial vehicle is mounted on the ground base platform. The guide structure has an inner diameter greater than a smallest outer diameter of the unmanned aerial vehicle landing gear and less than the largest outer diameter of the unmanned aerial vehicle landing gear.

3 Claims, 5 Drawing Sheets

LANDING STRUCTURE FOR AN UNMANNED AERIAL VEHICLE

CROSS REFERENCE TO RELATED APPLICATION

This application claims prior to U.S. Provisional Application No. 62/806,533 filed Feb. 15, 2019, the contents of which are herein incorporated.

BACKGROUND OF THE INVENTION

The present invention relates to a landing structure for an Unmanned Aerial Vehicle ("UAV"), and more particularly, a landing structure which significantly reduces the area needed at a landing site to land a UAV.

All UAVs land. Currently landing areas vary in size from 100 ft.$^2$ to 1000 ft.$^2$. Fixed wing UAVs require a greater landing rectangle or runway. Vertical takeoff and landing type UAVs require a cordoned off area typically 10 to 20 feet in diameter to account for inaccurate and off line landings. This requirement for such large landing areas often negates the ability for UAVs to be used effectively; particularly in closed quarter environments.

Accordingly, there is a need for a UAV landing structure which overcomes the shortcomings of the prior art.

SUMMARY OF THE INVENTION

A landing structure for an unmanned aerial vehicle includes a ground based platform. A guide structure for receiving the unmanned aerial vehicle therein is mounted on the platform and extends therefrom to receive the unmanned aerial vehicle. The guide structure has an inner diameter greater than a smallest outer diameter of landing gear of the unmanned aerial vehicle. The inner circumference of the guide is also less than a largest outer diameter of the unmanned aerial vehicle landing gear.

BRIEF DESCRIPTION OF THE DRAWINGS

The features and advantages of the present invention will become more readily apparent from the following detailed description of the invention in which like elements are labeled similarly and in which.

DETAILED DESCRIPTION OF THE PREFERRED EMBODIMENTS

Figure 1:
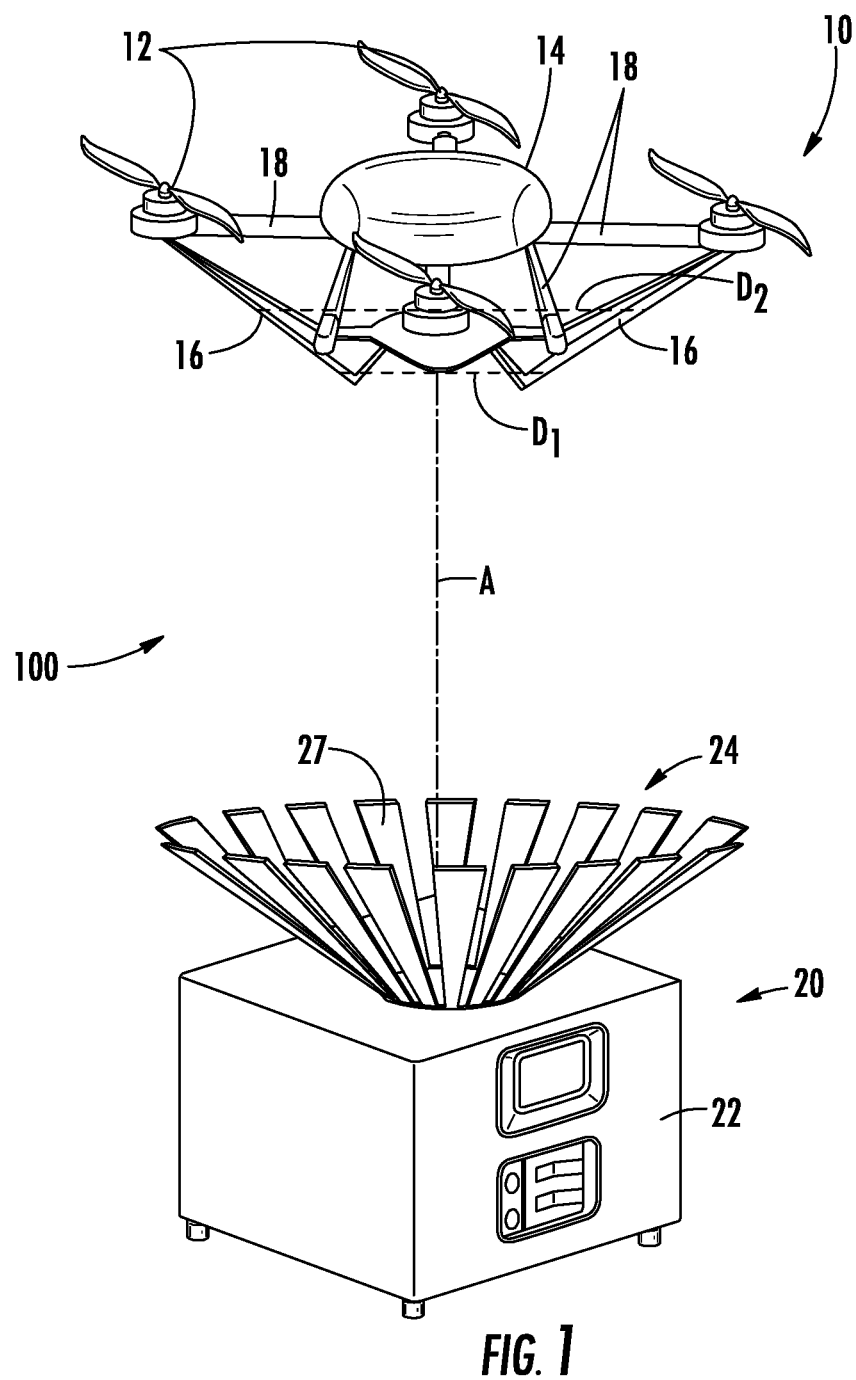
FIG. 1 is a perspective view of an unmanned aerial vehicle and landing structure constructed in accordance with the invention during a landing operation.
Figure 2:
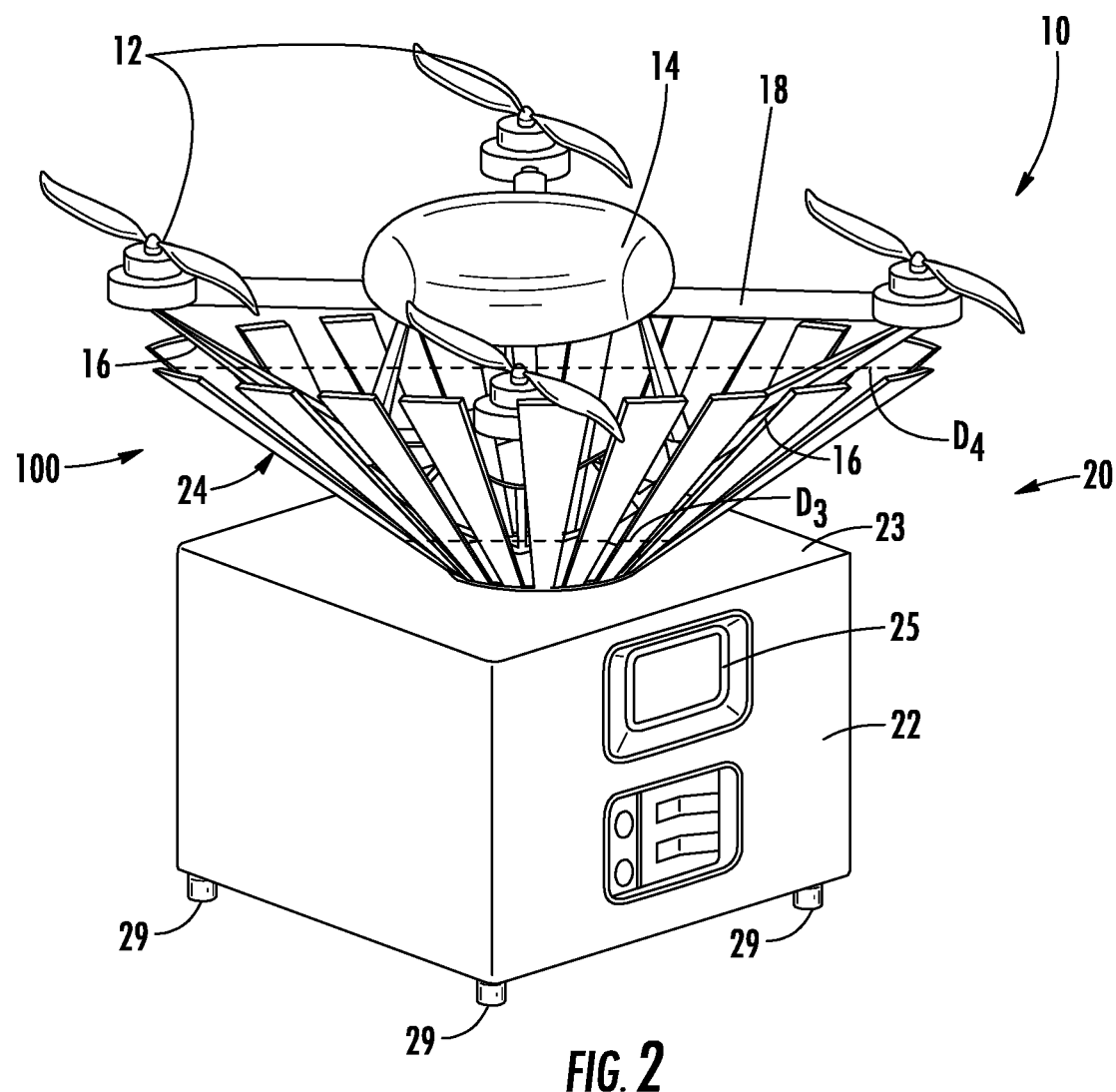
FIG. 2 is a perspective view of an unmanned aerial vehicle and landing structure constructed in accordance with the invention in a landed condition.

Reference is initially made to FIG. 1 in which a landing system 100 having a UAV, generally indicated as 10, and a landing structure generally indicated as 20, constructed in accordance with the invention is provided. UAV 10 includes a platform 14 for housing control circuitry, surveillance structures, sensors and the like as known in the art. Support struts 18 extend from platform 14 to rotors 12. A landing gear 16 is secured to any one of, and/or all of, platform 14, struts 18 and rotors 12. Landing gear 16 has a generally tapered structure, narrowing away from platform 14 and/or rotors 12, such that a first outer diameter $D_1$ is less than a second outer diameter $D_2$, wherein the second outer diameter $D_2$ is disposed between platform 14 and outer diameter $D_1$ and a greatest outer diameter is at a position closest to platform 14; i.e. furthest along the rising direction of UAV 10 compared to a position along landing gear 16 furthest in the descending direction.

Landing structure 20 includes a ground based platform 22. A guide 24 is mounted on ground-based platform 22 in an orientation to receive UAV 10 as it descends to land. In a preferred nonlimiting embodiment guide 24 is tapered; dish shaped having an opening facing away from ground based platform 22. Guide 24 has a greatest inner diameter $D_4$ at the dish opening and tapering to exhibit a second inner diameter $D_3$; less than inner diameter $D_4$ and disposed between ground-based platform 22 and inner diameter $D_4$. As a dish, guide 24 exhibits an angle of taper. In a preferred nonlimiting embodiment, the landing gear 16 exhibits a taper, the angle of taper of landing gear 16 is substantially the same as the angle of taper of an inner surface 27 of guide 24.

During operation, as system 100 transitions from a flying state to a landed state, UAV 10 descends towards and approaches guide 24 of ground based platform 20; preferably along a path A centered to guide 24. The opening of guide 24 has a greater diameter than a lower portion of guide 24; and a greater diameter than the leading portion of landing gear 16. If UAV 10 is off center relative to the center of guide 24, landing path A, tapered landing structure 16 will engage the inner surface 27 of guide 24. Because inner surface 27 of guide 24 is also tapered, inner surface 27 engages landing gear 16 so that landing gear 16 slides along the inner surface of guide 24 to be guided to the dead center position, landing path A, of the landing on ground-based platform 22 until UAV 10 comes to rest. The interaction of guide 24 and the tapered landing gear 16 compensates for any misalignment between UAV 10 and landing structure 20 as UAV 10 descends.

In a preferred nonlimiting embodiment, ground-based platform 22 is a housing having an interior region for storage covered by a lid 23 and provided with handles 25. In this way, ground-based platform 20 may serve the alternative purpose of storage of either guide 24 or UAV 10; or may house UAV control circuitry (not shown) for enhanced mobility and deployment. For stability, ground based platform 22 may be provided with feet 29 which may also be securable wheels for further mobility.

Figure 3:
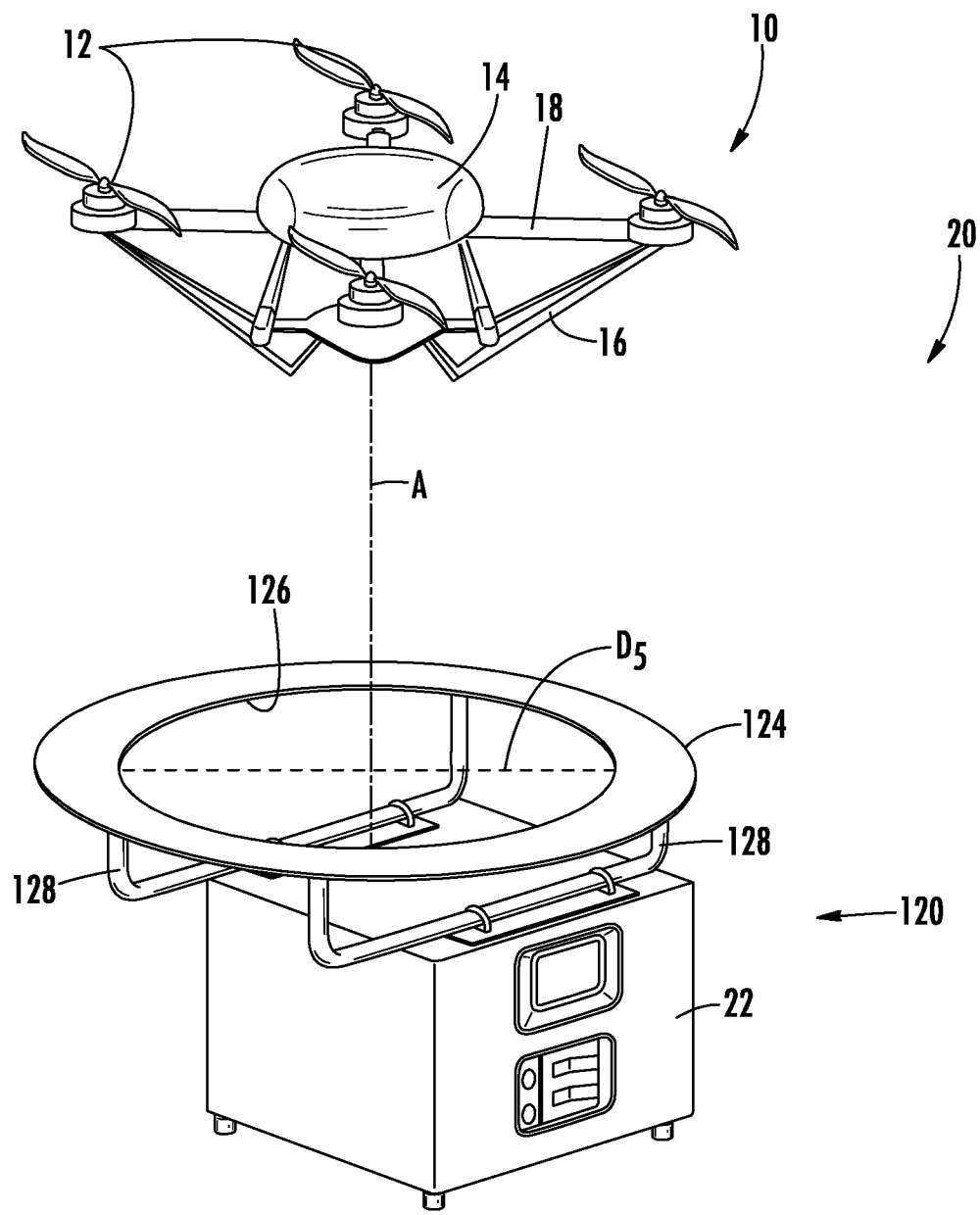
FIG. 3 is a perspective view of an unmanned aerial vehicle and landing structure constructed in accordance with a second embodiment of the invention during a landing operation.
Figure 4:
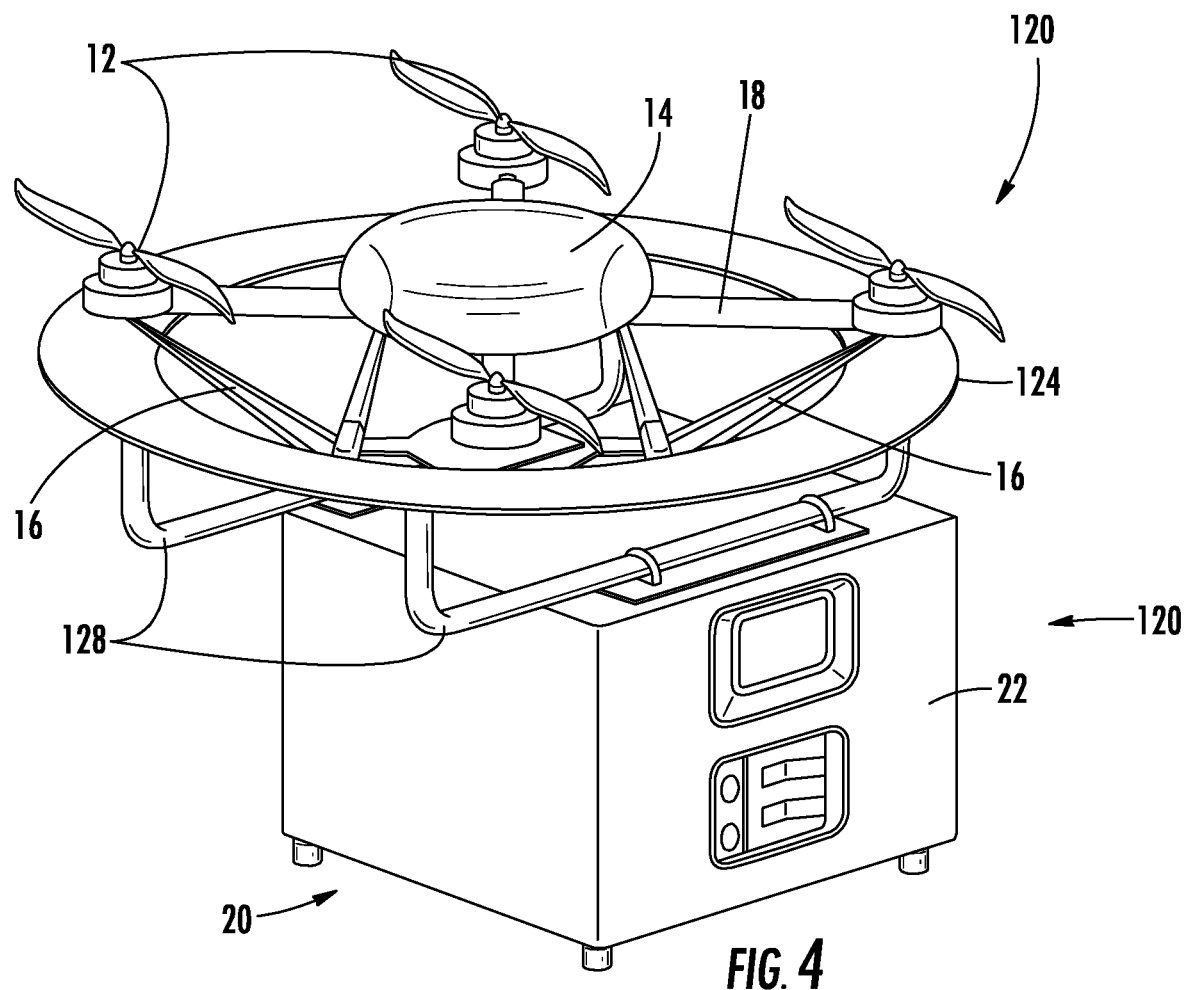
FIG. 4 is a perspective view of an unmanned aerial vehicle and landing structure constructed in accordance with the second embodiment of the invention in a landed condition.

Reference is now made to FIGS. 3 and 4 in which an alternative embodiment of a system for landing UAV 10, generally indicated as 200, is provided. Like numerals are utilized to indicate like structure. The primary difference between the preferred embodiment 100 and the second embodiment 200 is the use of a ring 124 as a guide in place of tapered guide 24.

The structure of the UAV 10 in system 200 is the same as the structure of UAV 10 in system 100. Landing structure 120 also includes a housing 22. However, the guide 124 is formed as a ring, having an opening 126 therein. The ring of guide 124 has an inner diameter $D_5$ which is greater than outer diameter $D_1$ of landing gear 16 of UAV 10, but less than outer diameter $D_2$ of landing gear 16 of UAV 10. Guide 124 is disposed at a distance spaced from housing 22 by facing spaced supports 128. The distance between supports 128 is at least equal to inner diameter $D_5$ so that none of supports 128 interferes with any structure extending through opening 126 of the ring forming guide 124 during landing.

Again during operation UAV 10 descends towards ground based platform 120; preferably along a centerline A. However, when UAV 10 is off-line, tapered landing gear 16 will engage the interior of the ring of guide 124. As landing gear 16 slides along the inner surface of the ring forming guide 124, during descent, a force is exerted moving UAV 10 toward centerline A as UAV 10 continues to descend into opening 126 until landed. In a preferred nonlimiting embodiment ring 124 is disposed a distance above platform 22 such that when UAV 10 is resting within ring 124, landing gear 16 does not contact platform 22. This is accomplished because the distance from a position at which landing gear 16 has a diameter equal to the interior diameter of ring 24 to a bottom of landing gear 16 is less than the distance from ring 124 to platform 22; the length of support 128.

Figure 5:
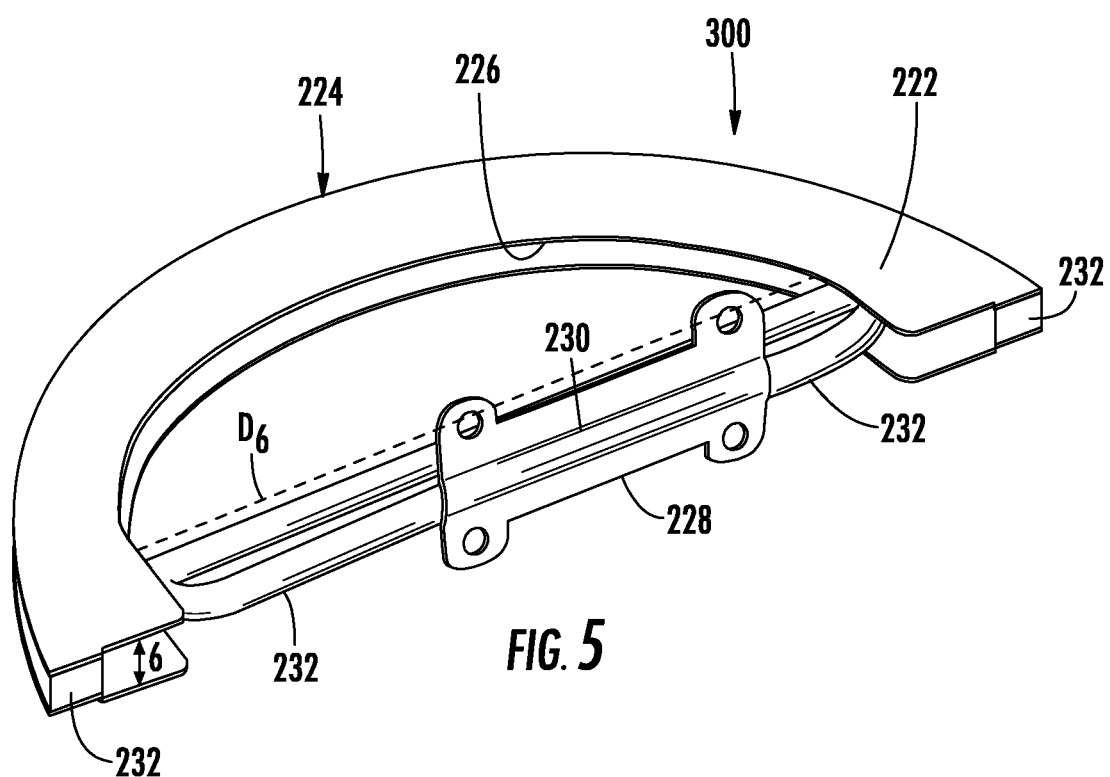
FIG. 5 is a perspective sectional view of a guide structure constructed in accordance with a third embodiment of the invention.

Reference is now made to FIG. 5 in which a third embodiment of a guide 300 formed as a ring 224 is shown. Ring 224 is formed with a substantially U shaped cross-section. A support 228 includes a bracket 230 which mounts to the side of housing 22. Struts 232 extend from opposed sides of bracket 230 and are received by a groove 6 formed by ring 224. Struts 232 are rotatable relative to bracket 230 to support ring 224 at a position above bracket 230; sufficient to receive UAV 10 without interference. Rotation of struts 232 raises and lowers ring 224 relative to housing 22 to which it is mounted.

As with guide 124, Ring 224 has an opening 226 with an inner diameter $D_6$. The diameter $D_6$ is greater than diameter $D_1$ of landing gear 16 of UAV 10, but less than the diameter $D_2$ of landing gear 16 of UAV 10. Therefore, as UAV 10 approaches ground-based platform 22 off-line from the desired landing trajectory, ring 224 will engage landing gear 16 at opening 226. As a result of the tapered structure of landing gear 16, UAV 10 will be guided by ring 224 towards the landing centerline.

Each of the above examples utilized a guide having a substantially circular opening. However, the system will operate with an opening which is square, elliptical, octagonal, or the like, so long as the inner diameter in all directions is greater than a smallest outer diameter of the UAV landing gear and less than a largest outer diameter of the UAV landing gear. In this way, the structure compensates for human error and inaccuracies by guiding an off centered descending UAV 10 to the desired landing spot center line, reducing the area required for the actual landing spot. The need to allow for off centered landing, the margin of error is greatly reduced.

It should be further recognized that the invention is not limited to the particular embodiments described above. Accordingly, numerous modifications can be made without departing from the spirit of the invention and scope of the claims appended hereto.

What is claimed is:

1. A system for landing an unmanned aerial vehicle comprising:
    an unmanned aerial vehicle, the unmanned aerial vehicle having a platform and a landing gear, the landing gear being tapered in a direction away from the platform;
    a ground-based platform; and
    a guide structure for receiving the unmanned aerial vehicle, the guide structure being mounted on the ground base platform, the guide structure being a substantially co-planar ring disposed a spaced distance from the platform and having an inner diameter greater than a smallest outer diameter of the unmanned aerial vehicle landing gear and less than the a largest outer diameter of the unmanned aerial vehicle landing gear.

2. The system for landing an unmanned aerial vehicle of claim 1; wherein the spaced distance is greater than a distance from a position along the landing gear where the diameter of the landing gear equals an inner diameter of the ring to a bottom of the landing gear.

3. The system for landing an unmanned aerial vehicle of claim 2; wherein the guide structure includes a first support and a second support each support being disposed between the platform and the ring, the ring having an inner diameter, a distance between the first support and the second support being greater than the inner diameter of the ring.

* * * * *